United States Patent [19]
Yoshimura

[11] 3,858,842
[45] Jan. 7, 1975

[54] CONTROL VALVE DEVICE
[75] Inventor: Zyunziro Yoshimura, Okazaki, Japan
[73] Assignee: Nippondenso Co., Ltd., Aichi-ken, Japan
[22] Filed: June 7, 1973
[21] Appl. No.: 368,047

[30]     Foreign Application Priority Data
         June 15, 1972   Japan................................ 47-70850

[52] U.S. Cl. ............................................ 251/61.2
[51] Int. Cl. ......................................... F16k 31/145
[58] Field of Search ............. 92/35; 251/61.2, 61.3, 251/61.4, 61.5

[56]              References Cited
              UNITED STATES PATENTS
2,332,630   10/1943   Fawkes ............................... 92/35 X
2,389,412   11/1945   Carlton .............................. 92/35 X
2,663,155   12/1953   Strobell ............................. 92/35 X
2,686,532    8/1954   Hard Af Segerstad ........ 251/61.5 X FOREIGN PATENTS OR APPLICATIONS
763,558   2/1934   France .................................. 92/35

Primary Examiner—Henry T. Klinksiek
Attorney, Agent, or Firm—Cushman, Darby & Cushman

[57]         ABSTRACT

A control valve device for closing and opening a fluid passage in response to a pressure signal is provided with a chamber composed of a pair of bellows for elongating and crumpling in accordance with the pressure signal thereby to achieve adequate closing and opening operation in such dusty and high temperature fluid as the exhaust gas emitted from an internal combustion engine.

1 Claim, 1 Drawing Figure

PATENTED JAN 7 1975　　　　　　　　　　　　3,858,842
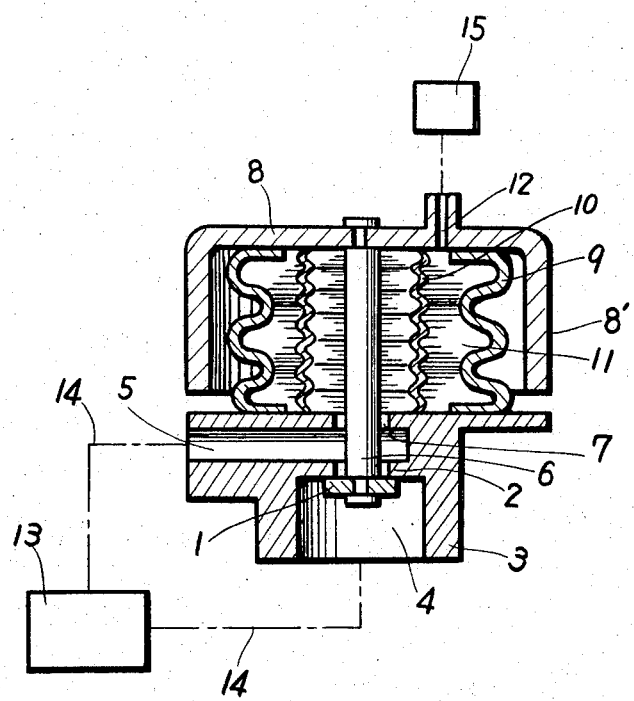

CONTROL VALVE DEVICE

BACKGROUND OF THE INVENTION

This invention relates to an improvement of a control valve device which operates to close and open the fluid passage in which dusty fluid is introduced.

In such a control valve device, especially in an exhaust gas recycling control valve which is installed in an exhaust gas recycling pipe connecting the exhaust pipe of the engine with the intake pipe to recycle a part of exhaust gas from the engine for reducing the amount of harmful exhaust gases, such as oxides of nitrogen, the valve stem thereof is apt to be locked by such dust and particles as carbon, vaporized water and other particles in the high temperature exhaust gas deposited in a clearance between the valve stem and a valve guide therefor. While enlarging the clearance between the valve stem and the valve guide seems to be effective against the occurance of the valve-stem locking phenomenon, leaking of the exhaust gas from the clearance and unstableness of the valve stem are unavoidable.

SUMMARY OF THE INVENTION

With a view to overcome the problem described above, it is a primary object of the present invention to provide an improved control valve device, which comprises a pair of bellows actuated by the pressure signal to operate a valve body and a large valve stem guiding aperture for passing the valve stem therethrough without usually contacting with each other, thereby to prevent the occurance of the valve stem locking in such dusty fluid as the exhaust gas emitted from the internal combustion engine.

The above and other objects, features and advantages of the present invention will be apparent from the following detailed description of a preferred embodiment thereof taken in conjunction with the accompanying drawing.

BRIEF DESCRIPTION OF THE DRAWING

The drawing shows a cross section of an embodiment of the present invention.

DESCRIPTION OF THE PREFERRED EMBODIMENT

Referring to the drawing, a valve body 1 is seated on a valve seat 2 formed in a valve member 3 to close the passages 4 and 5. The passage 4 is connected with the exhaust pipe of the engine 13 through an exhaust gas recycling pipe 14 and the passage 5 is connected with the intake pipe of the engine 13 through the recycling pipe 14. The valve stem 6 of the valve body 1 is inserted through a guiding aperture 7 formed in the valve member 3 and the top end of the stem is fixed to an inverted cup member 8. The diameter of the guiding aperture 7 is fairly larger than the diameter of the valve stem 6, therefore, the guiding aperture 7 does not usually contact with the valve stem 6, but restricts excessive swing motion of the stem 6. Numerals 9 and 10 designate a pair of bellows both of which are concentric to the valve stem 6 and the upper edges thereof are fixed airtightly to the inverted cup member 8 and the lower edges thereof are fixed airtightly to the upper surface of the valve member 3. A chamber 11 enclosed by the two bellows 9 and 10 is connected through a passage 12 to a pressure signal generator 15. Further, a lower skirt portion 8' of the inverted cup member 8 restricts excessive crumpling action of the bellows 9 and 10 and protects the bellows 9 and 10 from surrounding conditions.

Now, the operation of the above described valve device is as follows. In the stable condition, the control valve device settles as shown in the drawing, i.e., the valve body 1 is seated on the valve seat 2 owing to the resiliant expanding force of the bellows 9 and 10, closing the communication between the passages 4 and 5 through which the exhaust gas is to be recycled. When a negative or vacuum pressure signal is applied to the chamber 11 through the passage 12 from the pressure signal generator 15, the bellows 9 and 10 are crumpled to lower the inverted cup member 8 to make the valve body 1 unseated. As the valve body 1 opens the communication passage between passages 4 and 5, the exhaust gas recycles therethrough and a portion of the gas permeates into the inside of the bellows 10, but the guiding aperture 7 is large enough in comparison with the diameter of the valve stem 6 to prevent the deposition of the dust and particles, such as carbon, whereby the valve-stem locking phenomenon is sufficiently prevented. And the exhaust gas permeated into the inside of the bellows 10 is readily driven thereout during the subsequent action of the bellows 9 and 10 through the clearance formed around the valve stem 6, thereby to prevent the deposit from growing on the guiding aperture 7. Since the movement of the valve stem 6 is not usually restricted by nor contacts with the guiding aperture 7, the valve body 1 can seat on the valve seat 2 airtightly, even if the exhaust temperature is high enough to make the bellows 9 and 10 the valve member 3 deform.

Though only one embodiment of the present invention is described above, various modifications or other forms are possible without departing from the sprit of the present invention providing the improved control valve device which achieves the smooth opening and closing valve operation in dusty fluid by virtue of non-contact movement of the valve stem through the relatively large guiding aperture.

The advantages of the present invention is further enhanced when an anti-corrosive and heat-resistant material such as stainless steel is used to the parts of the device such as the valve body, stem and bellows.

What I claim is:

1. A control valve device for controlling the flow of exhaust gas which flows from an exhaust pipe of an engine to an intake pipe thereof, thereby to reduce harmful components of the exhaust gas emitted from the engine comprising:

a valve member having a passage therein connected with both the exhaust pipe and the intake pipe for passing the exhaust gas therethrough, a valve seat formed in the passage, a cup member, a pair of inner and outer bellows which are made of stainless steel, each being fixed to the inner surface of the cup member at one end thereof and each being fixed to the valve member at the other end thereof with a preselected distance remaining between a lower skirt portion of said cup member and the valve member to restrict excessive crumpling action of said bellows, a passage means provided in the cup member opening to a chamber enclosed by the bellows, the cup member, and the valve member for actuating the bellows according to an external pressure signal applied to the chamber therethrough, a valve stem having one end which is fixed to said cup member, said stem being installed through the inner part of the inner bellows and guided by the valve member, a valve body fixed to the other end of the valve stem for being seated on the valve seat by only a resilient expanding force of the bellows when the external pressure signal is not applied, whereby the flow of the exhaust gas is controlled according to the external pressure signal applied to the chamber.

* * * * *